Patented Nov. 16, 1943

2,334,607

UNITED STATES PATENT OFFICE 2,334,607

PEPTIZING AGENT

Edward F. Christopher, Chicago, Ill., assignor to Industrial Patents Corporation, Chicago, Ill., a corporation of Delaware No Drawing. Application June 16, 1939, Serial No. 279,521

22 Claims. (Cl. 106—146)

This invention relates to a method of rendering casein soluble in water.

One of the objects of this invention is to provide a method of dissolving casein in water.

Another object of this invention is to prepare a water soluble casein product.

Other objects and advantages of this invention will become apparent from the description and claims which follow.

It is well recognized that casein is relatively insoluble in water. Casein may be peptized by the addition of water soluble hydroxides or carbonates of the alkali metals or the alkaline earth metals, or may be dissolved in water containing hydroxides or carbonates of the alkali metals or the alkaline earth metals.

The present invention contemplates peptizing casein with neutral soluble salts of certain organic dibasic acids, substituted derivatives of the acids, and imides of the acids. Casein is added to water in the presence of the neutral soluble salt.

Examples of the salts of certain of the organic dibasic acids, substituted derivatives of the acids, and the imides of the acids which are satisfactory for the purposes of my invention are the neutral soluble salts of phthalic acid, substituted derivatives of phthalic acid, phthalimide, substituted derivatives of phthalimide, naphthalic acid, maleic acid, succinic acid, and succinimide. Specifically, the peptizing agent may be a neutral sodium or potassium salt of phthalic acid, isophthalic acid, terephthalic acid, tetrachlorophthalic acid, nitrophthalic acid, 3-nitrophthalic acid, phthalimide, 3-nitrophthalimide, maleic acid, naphthalic acid, succinic acid, and succinimide.

The term "substituted derivatives" is used to designate those compounds in which one or more hydrogen atoms have been replaced by some other atom or group, for example, in tetrachlorophthalic acid, the four free hydrogen atoms attached to the benzene ring have been replaced by chlorine, and in 3-nitrophthalimide three of the hydrogen atoms have been replaced by NO₂ groups.

In practicing my invention, a neutral aqueous solution of the neutral soluble salt is prepared and the casein then dissolved or dispersed in the solution. The aqueous solution of the salt and casein may be employed as a sizing agent or coating material for paper, textile fabrics, and the like as substitutes for starch, dextrine, and the like. The aqueous solution may also be employed as an adhesive. Many other uses will be suggested to those skilled in the art, the above uses merely illustrating the utility of the solution or dispersion of casein prepared in accordance with my invention.

My invention may be more specifically illustrated by the following example. An aqueous solution is first prepared by dissolving in water about 50 per cent of a neutral soluble salt of the type described, for example, neutral sodium phthalate, neutral potassium phthalate, sodium phthalimide or potassium phthalimide, the per cent of salt being based upon the weight of the casein which is to be dissolved. Casein may then be dissolved or dispersed readily in the water.

In the use of the substituted derivatives of the dibasic acids I have found that the presence of certain substituents increases while the presence of other substituents decreases the desirable peptizing properties. The substituted derivatives exhibit the peptizing power or property but those derivatives having different substituents exhibit the power to different degrees.

My invention may also be practiced by preparing a soluble casein product by adding to and thoroughly mixing with dry casein a neutral soluble salt of the organic compounds mentioned above. For example, a soluble casein product may be prepared by mixing equal parts by weight of finely divided casein and finely divided or powdered neutral soluble salts of the organic acids mentioned above. The casein product may be dissolved readily in water.

The term, neutral soluble salt, is employed herein and in the claims to designate a water soluble salt of the type disclosed, whose aqueous solution is substantially neutral.

I claim:

1. The method of dissolving casein in water which comprises adding substantially dry casein to water in the presence of a substance selected from the class consisting of neutral soluble salts of phthalic acid, substituted derivatives of phthalic acid, phthalimide, substituted derivatives of phthalimide, naphthalic acid, maleic acid, succinic acid, and succinimide.

2. The method of dissolving casein in water which comprises adding substantially dry casein to water in the presence of a substance selected from the class consisting of neutral sodium salts of phthalic acid, substituted derivatives of phthalic acid, phthalimide, substituted derivatives of phthalimide, naphthalic acid, maleic acid, succinic acid, and succinimide.

3. The method of dissolving casein in water which comprises adding substantially dry casein to water in the presence of a substance selected from the class consisting of neutral potassium salts of phthalic acid, substituted derivatives of phthalic acid, phthalimide, substituted derivatives of phthalimide, naphthalic acid, maleic acid, succinic acid, and succinimide.

4. The method of preparing a casein product adapted to be dissolved readily in water to form a coating composition which comprises mixing with substantially dry casein a substance selected from the group consisting of neutral soluble salts of phthalic acid, substituted derivatives of phthalic acid, phthalimide, substituted derivatives of phthalimide, naphthalic acid, maleic acid, succinic acid, and succinimide.

5. The method of preparing a casein product adapted to be dissolved readily in water to form a coating composition which comprises mixing with substantially dry casein a substance selected from the group consisting of neutral sodium salts of phthalic acid, substituted derivatives of phthalic acid, phthalimide, substituted derivatives of phthalimide, naphthalic acid, maleic acid, succinic acid, and succinimide.

6. The method of preparing a water soluble casein product adapted to be dissolved readily in water to form a coating composition which comprises mixing with casein a substance selected from the class consisting of neutral potassium salts of phthalic acid, substituted derivatives of phthalic acid, phthalimide, substituted derivatives of phthalimide, naphthalic acid, maleic acid, succinic acid, and succinimide.

7. The method of preparing a casein product adapted to be dissolved readily in water to form a coating composition which comprises mixing with substantially dry casein a neutral soluble salt of phthalic acid.

8. The method of preparing a water soluble casein product which comprises mixing with casein a neutral soluble salt of naphthalic acid.

9. The method of preparing a casein product adapted to be dissolved readily in water to form a coating composition which comprises mixing with substantially dry casein a neutral sodium salt of phthalic acid.

10. The method of preparing a water soluble casein product which comprises mixing with casein a sodium salt of naphthalic acid.

11. The method of preparing a water soluble casein product which comprises mixing with casein a potassium salt of phthalic acid.

12. As an article of manufacture, a water soluble casein product comprising casein and a neutral soluble salt of naphthalic acid.

13. As an article of manufacture, a water soluble casein product comprising casein and a sodium salt of naphthalic acid.

14. As an article of manufacture, a water soluble casein product comprising casein and a potassium salt of phthalic acid.

15. As an article of manufacture, a casein product adapted to be dissolved readily in water to form a coating composition consisting essentially of substantially dry casein and a substance selected from the class consisting of neutral soluble salts of phthalic acid, substituted derivatives of phthalic acid, phthalimide, substituted derivatives of phthalimide, naphthalic acid, maleic acid, succinic acid, and succinimide.

16. As an article of manufacture, a casein product adapted to be dissolved readily in water to form a coating composition consisting essentially of substantially dry casein and a substance selected from the class consisting of neutral sodium salts of phthalic acid, substituted derivatives of phthalic acid, phthalimide, substituted derivatives of phthalimide, naphthalic acid, maleic acid, succinic acid, and succinimide.

17. As an article of manufacture, a casein product adapted to be dissolved readily in water to form a coating composition consisting essentially of substantially dry casein and a substance selected from the class consisting of neutral potassium salts of phthalic acid, substituted derivatives of phthalic acid, phthalimide, substituted derivatives of phthalimide, naphthalic acid, maleic acid, succinic acid, and succinimide.

18. As an article of manufacture, a casein product adapted to be dissolved readily in water to form a coating composition consisting essentially of substantially dry casein and a neutral soluble salt of phthalic acid.

19. As an article of manufacture, a casein product adapted to be dissolved readily in water to form a coating composition consisting essentially of substantially dry casein and a neutral sodium salt of phthalic acid.

20. The method of dissolving casein in an aqueous solution which comprises forming an aqueous solution of a salt selected from the class consisting of neutral soluble salts of phthalic acid, substituted derivatives of phthalic acid, phthalimide, substituted derivatives of phthalimide, naphthalic acid, maleic acid, succinic acid, and succinimide, and dissolving casein in the aqueous salt solution.

21. The method of dissolving casein in an aqueous solution which comprises mixing casein with a salt selected from the class consisting of neutral soluble salts of phthalic acid, substituted derivatives of phthalic acid, phthalimide, substituted derivatives of phthalimide, naphthalic acid, maleic acid, succinic acid, and succinimide, and dissolving the mixture in a solution comprising water.

22. As a new composition of matter, an aqueous casein solution comprising water, casein and a substance selected from the class consisting of neutral soluble salts, phthalic acid, substituted derivatives of phthalic acid, phthalimide, substituted derivatives of phthalimide, naphthalic acid, maleic acid, succinic acid and succinimide.

EDWARD F. CHRISTOPHER.